United States Patent Office 3,009,904
Patented Nov. 21, 1961

3,009,904
PROCESS FOR THE HALOGENATION OF BUTYL RUBBER WITH CHLORINE AND BROMINE, AND PRODUCT OBTAINED THEREBY
George E. Serniuk, Roselle, Irving Kuntz, Roselle Park, and Francis P. Baldwin, Colonia, N.J., assignors to Esso Research and Engineering Company, a corporation of Delaware
No Drawing. Filed Apr. 11, 1958, Ser. No. 727,794
7 Claims. (Cl. 260—85.3)

This invention relates to rubbery copolymers of isoolefins and multiolefins containing an admixture of combined chlorine and combined bromine. The invention further relates to butyl rubber copolymers containing compositions having combined therewith both chlorine and bromine, said compositions when subsequently compounded with curatives and vulcanized exhibiting a combination of increased tensile strength, increased extension modulus, and increased adhesion to more highly unsaturated rubbery polymeric materials such as natural rubber, rubbery diene-styrene copolymers, rubbery diene-nitrile copolymers, or the like.

Surprisingly it has been found that by combining the above mixed halogens with butyl rubber that the foregoing physical characteristics of the resulting vulcanizates or covulcanizates with highly unsaturated rubbery polymers are synergistically better than either the corresponding chlorinated or brominated butyl rubbers.

The mixed halogen containing butyl rubber to be produced in accordance with the instant invention is made by the mild halogenation of the unvulcanized rubber at temperatures of about $-50°$ to $+200°$ C. as more fully described hereinafter. Such a rubber before mixed halogenation is essentially a vulcanizable rubbery hydrocarbon copolymer containing about 85 to 99.5%, preferably 95-99.5% of a $C_4$ to $C_8$ isoolefin such as 2-methyl-1-butene, 3-methyl-1-butene, or especially isobutylene, the remainder being a $C_4$ to $C_{14}$ multiolefin, preferably a $C_4$ to $C_6$ conjugated diolefin such as butadiene, dimethyl butadiene, piperylene or especially isoprene or such other multiolefins as myrcene, dimethallyl or the like. The resulting copolymer generally has a Staudinger molecular weight of about 20,000 to 150,000, a mole percent unsaturation of between about 0.5 to 15.0, and an iodine number of about 0.5 to 100.0 (Wijs). The preparation of butyl rubber is described in U.S. Patent 2,356,128 to Thomas et al. and also in other patents as well as in the literature.

It has now been discovered that when butyl rubber is reacted with an admixture of at least about 0.1 weight percent each of bromine and chlorine, but under conditions such that the ratio of halogens is not more than about 1 gram atom and preferably not more than 0.5 gram atom of chlorine and about 3 atoms (preferably 2 atoms) of bromine for each double bond in the rubber, that superior tensile, modulus, and adhesion values are obtained upon subsequent vulcanization.

In practicing the present invention, rubbery materials of the type of butyl rubber are chloro-brominated or bromo-chlorinated as more fully described hereinafter preferably to contain at least 0.5 weight percent each of bromine and chlorine but not more than about three atoms of chlorine per four double bonds and not more than about two atoms of bromine for each double bond in the original copolymer rubber. It is more preferred, however, that the upper limit for the combined chlorine be limited to not more than about 1 atom per two double bonds and that the bromine combined in the butyl rubber copolymer be limited to not more than about 1 atom per double bond and preferably not more than about 1 atom of combined bromine per two double bonds in the copolymer.

The introduction of the mixed halogens into the polymer may be accomplished in a number of ways. For instance, the butyl rubber may be reacted with a mixture of bromine and chlorine (or suitable bromination and chlorination agents) at temperatures of about $-50°$ to $+200°$ C. under conditions of temperature and pressure to combine the above-mentioned amounts of each respective halogen with the butyl rubber copolymer whereby to produce the bromo-chloro-copolymer. Alternatively, butyl rubber may be reacted first with bromine or a brominating agent and this reaction product subsequently contacted with chlorine or a chlorination agent resulting in the production of a bromo-chloro-polymer. However, it is especially advantageous to react a butyl rubber dissolved in a solvent first with the chlorine or chlorinating agent and subsequently to contact this reaction mixture with bromine or a brominating agent, or, if preferred, to isolate the chlorinated product and subsequently dissolve it in a suitable solvent and contact the chlorinated product with bromine or a brominating agent. Depending upon the particular chlorinating or brominating agent, the temperatures of halogenation in each step may be regulated to a temperature of about $-50°$ to $+200°$ C. but preferably to about $0°$ to $+150°$ C.

Suitable halogenating agents which may be employed are chlorine, bromine, alkali metal hypochlorides and hypobromites, sulfur chlorides and bromides, chloro or bromo hydantoins, alpha-bromo- or chloro-aceto-acetanilide, bromo- and chloro-succinimide, sulfuryl chloride and bromide, iodine chloride and bromide, chloro- and bromophthalimides, and other common chlorinating and brominating agents. Each respective halogenation or the mixed halogenation is conducted preferably in solution at about $20°$ to $60°$ C. for one minute to several hours. However, the times and temperatures are regulated to introduce the amounts of chlorine and bromine into the rubbery copolymer to the extent above-mentioned. Vulcanization of the resulting bromo-chloro-copolymers may be effected in the presence or absence of other more highly unsaturated rubbers by means of conventional quantities of sulfur, zinc oxide, polymethylol phenol resins, quinone dioximes or the like at $250°$ to $400°$ F. for several minutes up to several hours or more.

In order to more fully illustrate the present invention, the following experimental data are given:

EXAMPLE 1

A sample of chlorinated butyl rubber (hereinafter referred to as chlorinated butyl rubber "A") containing 1.2 weight percent chlorine and having a viscosity average molecular weight of 430,000 was dissolved to form a 10 weight percent solution in benzene. Liquid bromine (5% based on rubber) was then added and allowed to react for 1½ hours at room temperature. The mixed chlorobromo copolymer formed was isolated by a multiple-solution precipitation technique using acetone as the anti-solvent and benzene as the solvent for three times. The resulting chlorine and bromine containing butyl rubber was analyzed and found to have 1.1% chlorine and 0.3% bromine. This product exhibited an intrinsic viscosity of 1.35 and a viscosity average molecular weight of 416,000.

EXAMPLE 2

The same procedure as in Example 1 was repeated except that 2% by weight of bromine was employed to brominate the chlorinated butyl rubber. The resulting bromine and chlorine-containing product, on analysis, was found to contain 1.15% chlorine and 0.26% bromine.

EXAMPLE 3

Samples of chlorinated butyl rubber A and the mixed chlorine-bromine-containing butyl rubber of Example 1 were compounded on a rubber mill at room temperature according to the following formulation.

Component: Parts by weight
- Modified butyl rubber _____ 80
- Smoked sheet _____ 20
- SRF carbon black _____ 50
- Zinc oxide _____ 5
- Sulfur _____ 2
- Tellurium diethyl dithiocarbamate _____ 1

Upon curing the foregoing compounded modified butyl rubber stocks at 310° F. for 40 minutes, the following stress-strain properties were noted:

| Property | Chlorinated Butyl Rubber "A" containing 1.2% chlorine | Rubber of Example 1 containing 1.1% chlorine and 0.3% bromine |
|---|---|---|
| Tensile strength (p.s.i.) | 1,150 | 1,390 |
| Elongation (percent) | 350 | 320 |
| Modulus at 300% elongation (p.s.i.) | 1,075 | 1,325 |

The above data show that butyl rubber modified to contain an admixture of both chlorine and bromine exhibits a combination of higher tensile strength and extension modulus compared to a chlorinated butyl rubber stock.

*Run A.*—One hundred grams of a commercial butyl rubber having a Mooney viscosity at 212° F. for 8 minutes of 43, a mole percent unsaturation by the drastic iodine-mercuric acetate method of 2.3, a viscosity average molecular weight of 340,000, and an iodine number of 17.36 were dissolved in 1,000 milliliters of hexane. The solution was treated with 30 grams of diatomaceous earth (i.e., Hy-Flo, a filter aid) for ½ hour at 40° C. and filtered directly into a two liter, four way reaction flask which was subsequently fitted with a mechanical stirrer, reflux condenser, thermometer, and dropping funnel. Chlorine, 3.24 grams (equivalent to one mole of chlorine per mole of polymer double bonds) dissolved in 250 ml. of cold carbon tetrachloride, was added to the agitated polymer solution at room temperature over a period of one hour. The reaction mixture was agitated until there was no further evolution of hydrogen chloride. The chlorinated polymer formed was purified by a multiple solution precipitation teachnique using benzene as the solvent and acetone as the anti-solvent. Three solutions and precipitations were effected. The residual solvents were then stripped from the chlorined product by heating for 16 hours at 180 mm. Hg pressure absolute. Upon analysis, the product was found to have a chlorine content of 0.81 weight percent.

*Run B.*—Run A was repeated except that 7.3 grams of of bromine, equivalent to one mole of bromine per mole of polymer double bonds was used instead of chlorine. The liquid bromine was added to the hexane solution of the polymer as a predissolved solution in 350 ml. of carbon tetrachloride. Upon recovery of the brominated butyl rubber, it was tested as in run A. The product was found to contain 2.68 weight percent bromine.

EXAMPLE 4

Run A was repeated except that the polymer was first chlorinated by adding 1.62 grams of chlorine in 250 ml. of carbon tetrachloride and then brominated by adding 3.65 grams of bromine also in 250 ml. of carbon tetrachloride; the halogenations being at room temperature. The amount of each halogen used was calculated so as to obtain approximately 50% bromination and 50% chlorination. Upon purification as in run A, the chloro-bromo product was found to contain 0.68 weight percent of chlorine and 0.95 weight percent of bromine (i.e., 0.42 mole percent of chlorine and 0.58 mole percent of bromine).

The products of runs A and B and Example 4 were then evaluated as follows for their adhesion to a cured GR-S tread stock. Said products were compounded according to a tie gum test recipe hereinafter disclosed, the compounding of the GR-S tread likewise being given hereinafter.

The procedure for preparing the test specimens was as follows:

After the GR-S tread stock was compounded, a square woven canvass backing was applied to one side and the stock cured for 30 minutes at 307° F. in a 2 x 6 x ⅛" mold. The cured tread face was then buffed and coated with a cement comprising 18 weight percent of the tie gum composition in 97 weight percent of hexane and 3 weight percent of isopropanol. Each cement coating was then dried for one hour. In order to produce a sandwich type of structure, the coated surfaces of the buffed and cured GR-S tread stock were placed face to face with the raw tie gum stock in between. At one end of this sandwich, there was then inserted two layers of Holland cloth between the tread and tie gum. There was then applied sufficient square woven canvass to the tie gum to complete a 2 x 6 x ½" test sandwich and the sandwich was hand stitched. This sandwich was then cured for 40 minutes at 307° F. and strips were cut therefrom of a dimension of 1 x 6 x 0.25". The Holland cloth was then removed and the strips of test sandwiches tested for adhesion in a Scott tensile tester at 212° F. with a rate of pull of 2" per minute.

There is summarized in Tables I and II the compounding of the tie gum and tread stocks and the results of the adhesion data after vulcanization respectively.

*Table I*

| Component | Tie Gum Stock, parts by weight | Tread Stock, parts by weight |
|---|---|---|
| Mixed chloro-bromo butyl rubber | 100 | |
| GR-S 1500 | | 67 |
| Natural rubber | | 33 |
| MPC carbon black | 40 | |
| SRF carbon black | | 20 |
| HAF carbon black | | 20 |
| Polymethylol phenol resin (i.e., Amberol ST-137X) | 10 | |
| Stearic acid | 1 | 1 |
| Hydrocarbon plasticizer oil A [1] | 10 | |
| Hydrocarbon plasticizer oil B [2] | | 10 |
| Zinc oxide | 5 | 5 |
| Sulfur | 1.5 | 3 |
| Diortho tolyl guanidine | 1.0 | |
| Benzothiazyl disulfide | | 1 |
| Phenyl beta naphthylamine | 1.0 | 1 |

[1] Hydrocarbon plasticizer oil A is derived from a naphthenic crude and has a specific gravity of 0.90, a flash point in ° F. by the open cup method of 445, a viscosity in S.S.U. at 100° F. of 510, a viscosity in S.S.U. at 210° F. of 55, and an iodine number of cg./g. of 16.

[2] Hydrocarbon plasticizer oil B is derived from a naphthenic crude and has a specific gravity of 0.96, a flash point in ° F. by the open cup method of 520, an aniline point of 177° F., a viscosity in S.S.U. at 100° F. of 11,600, a viscosity in S.S.U. at 210° F. of 250, and an iodine number of cg./g. of 49.

| | Product Tested | | |
|---|---|---|---|
| | Run A (Cl) | Run B (Br) | Example IV (Cl-Br) |
| Modulus at 300% Extension (p.s.i.) | 270 | 530 | 520 |
| Tensile strength (p.s.i.) | 1,280 | 1,270 | 1,520 |
| Elongation at break (percent) | 700 | 480 | 600 |
| Shore "A" hardness | 45 | 45 | 46 |
| Adhesion to GR-S, #/inch at 212° F. | 11.9 | 10.8 | 16.2 |

The data in Table II show that butyl rubber modified to contain both chlorine and bromine unexpectedly exhibits higher tensile strength and much better adhesion to GR-S rubber compared to butyl rubber modified solely with either chlorine or bromine. The resulting chloro-bromo product has utility in tires, tire curing bags or bladders, rubber hose, belting, car window channels, etc.

Resort may be had to modifications and variations of the disclosed embodiments of the present invention without departing from the spirit of the invention or the scope of the appended claims.

What is claimed is:

1. A process which comprises halogenating a butyl rubber copolymer of an isoolefin with a multiolefin at a temperature between 0 and 100° C. by a first reaction with elemental chlorine and a second reaction with elemental bromine to incorporate by substitution at least 0.5 weight percent each of chlorine and bromine therein but the ratio of combined halogens being not more than about one atom of combined chlorine and about two atoms of combined bromine per double bond in the copolymer to provide a halogenated copolymer therefrom which is capable of being placed adjacent to a previously vulcanized high unsaturation rubber layer selected from the group consisting of natural rubber, diene-styrene rubber, and diene-acrylonitrile rubber; and subsequently being cured to provide a product having improved adhesion between said halogenated copolymer and said layer.

2. A composition comprising an unvulcanized halogenated butyl rubber copolymer of an isoolefin with a multiolefin having been formed at a temperature between 0 and 100° C. by first reacting a butyl rubber copolymer with elemental chlorine and then reacting the chlorinated copolymer with elemental bromine to incorporate by substitution at least 0.5 weight percent each of chlorine and bromine therein but the ratio of combined halogens being not more than about one atom of combined chlorine and about two atoms of combined bromine per double bond in the copolymer; said halogenated rubber being capable of being cured in the presence of a previously vulcanized high unsaturated rubber layer to provide improved adhesion between said halogenated copolymer and said rubber layer; said rubber layer being selected from the group consisting of natural rubber, diene-styrene rubber, and diene-acrylonitrile rubber.

3. A composition according to claim 2 in which the isoolefin is isobutylene and the multiolefin is isoprene.

4. A process which comprises halogenating a butyl rubber copolymer of an isoolefin with a multiolefin at a temperature between 0 and 100° C. by a first reaction with elemental bromine and a second reaction with elemental chlorine to incorporate by substitution at least 0.5 weight percent each of chlorine and bromine therein but the ratio of combined halogens being not more than about one atom of combined chlorine and about two atoms of combined bromine per double bond in the copolymer to provide a halogenated copolymer therefrom which is capable of being placed adjacent to a previously vulcanized high unsaturation rubber layer selected from the group consisting of natural rubber, diene-styrene rubber, and diene-acrylonitrile rubber; and subsequently being cured to provide a product having improved adhesion between said halogenated copolymer and said layer.

5. A composition comprising an unvulcanized halogenated butyl rubber copolymer of an isoolefin with a multiolefin having been formed at a temperature between 0 and 100° C. by first reacting a butyl rubber copolymer with elemental bromine and then reacting the brominated copolymer with elemental chlorine to incorporate by substitution at least 0.5 weight percent each of chlorine and bromine therein but the ratio of combined halogens being not more than about one atom of combined chlorine and about two atoms of combined bromine per double bond in the copolymer; said halogenated rubber being capable of being cured in the presence of a previously vulcanized high unsaturated rubber layer to provide improved adhesion between said halogenated copolymer and said rubber layer; said rubber layer being selected from the group consisting of natural rubber, diene-styrene rubber, and diene-acrylonitrile rubber.

6. A process which comprises halogenating a butyl rubber copolymer of an isoolefin with a multiolefin at a temperature between 0 and 100° C. by a first reaction with an elemental halogen selected from the group consisting of chlorine and bromine and a second reaction with the other elemental halogen which is not selected in the first reaction to incorporate by substitution at least 0.5 weight percent each of chlorine and bromine therein but the ratio of combined halogens being not more than about one atom of combined chlorine and about two atoms of combined bromine per double bond in the copolymer to provide a halogenated copolymer therefrom which is capable of being placed adjacent to a previously vulcanized high unsaturation rubber layer selected from the group consisting of natural rubber, diene-styrene rubber, and diene-acrylonitrile rubber; and subsequently being cured to provide a product having improved adhesion between said halogenated copolymer and said layer.

7. A composition comprising an unvulcanized halogenated butyl rubber copolymer of an isoolefin with a multiolefin having been formed at a temperature between 0 and 100° C. by first reacting a butyl rubber copolymer with an elemental halogen selected from the group consisting of chlorine and bromine and then reacting with the elemental halogen not selected in the first reaction to incorporate by substitution at least 0.5 weight percent each of chlorine and bromine therein but the ratio of combined halogens being not more than about one atom of combined chlorine and about two atoms of combined bromine per double bond in the copolymer; said halogenated rubber being capable of being cured in the presence of a previously vulcanized high unsaturated rubber layer to provide improved adhesion between said halogenated copolymer and said rubber layer; said rubber layer being selected from the group consisting of natural rubber, diene-styrene rubber, and diene-acrylonitrile rubber.

References Cited in the file of this patent

UNITED STATES PATENTS

| | | |
|---|---|---|
| 2,732,354 | Morrissey et al. | Jan. 24, 1956 |
| 2,809,372 | Frederick et al. | Oct. 8, 1957 |
| 2,831,839 | Canterino et al. | Apr. 22, 1958 |